MAGNETIC TAPE TRANSPORT MACHINE

Filed May 3, 1965 4 Sheets-Sheet 1

INVENTORS
HAROLD A. LARSON
FREDERICK A. SCHULTZ
LEONARD H. THOMPSON
JACK F. WELLS

BY Bernard M. Goldman
ATTORNEY

March 28, 1967 H. A. LARSON ETAL 3,311,280

MAGNETIC TAPE TRANSPORT MACHINE

Filed May 3, 1965 4 Sheets-Sheet 4

United States Patent Office 3,311,280

Patented Mar. 28, 1967

3,311,280

MAGNETIC TAPE TRANSPORT MACHINE

Harold A. Larson and Frederick A. Schultz, Poughkeepsie, N.Y., Leonard H. Thompson, Lexington, Ky., and Jack F. Wells, Poughkeepsie, N.Y., assignors to International Business Machines Corporation, Armonk, N.Y., a corporation of New York Filed May 3, 1965, Ser. No. 452,831

9 Claims. (Cl. 226—195)

This invention relates generally to tape transports having mechanical buffering between a tape reel and a tape drive mechanism, such as a capstan, to maintain a tension on the tape within prescribed limits under all operating conditions. In particular, this invention relates to an arrangement in a tape transport for controlling the positions of mechanical buffer arms in relation to loading and unloading tape and the normal read or write operation on tape.

In the prior art, mechanical buffer arms have long been used for buffering a slack loop of tape between a tape reel and a tape drive mechanism to control tape tension under varying start-stop conditions, in order to prevent tape breakage and to permit constant velocity for tape movement by a tape read or write device. Objects of this invention are to:

(1) Obtain a minimum manual effort in operating a relatively simple type of tape transport.

(2) Provide a tape transport having easy tape threading.

(3) Provide a tape transport having one or more capstans and permitting tape threading which avoids the capstans.

(4) Eliminate the necessity for moving either the recording head, or a head pressure pad, during tape loading or tape operation.

(5) Automatically remove the tape from the head during high speed tape movement.

(6) Automatically position tape for rewind upon the start of high speed backward tape movement.

(7) Provide a substantially constant buffer force on the tape being processed.

(8) Eliminate the necessity for having a capstan pressure roll for controlling tape movement.

(9) Provide a substantially constant force on both ends of tape wrapped about a capstan to minimize tape slippage on the capstan.

This invention provides a transport for tape which may be of any type, such as the magnetic surface type or the punch tape type, etc. The invention utilizes a plate cooperating with a buffer arm in a transport, wherein tension on the buffer arm beyond a normal amount causes a binding action for the buffer arm with the plate, which automatically positions the buffer arm in a load or rewind position to simplify tape threading and removing the tape from the driving means (such as the capstan), from the tape read or write means (such as a tape head), and from any other device which may normally be in the tape path during a normal read or write operation. The plate accordingly is movable on the transport between a normal position and a load or rewind position for tape. Also, tension means is provided between the buffer arm and the plate which tends to provide a linear force application on the tape as it passes over the buffer arm to maintain an operating tension on the tape that varies between narrow limits. The linear force relationship enhances capstan operation where the driving force provided to the tape by the capstan is derived from friction over an angle of wrap of the tape about the capstan. Furthermore, a mechanical coupling may be provided between the plate and an idler arm so that movement of the plate between normal position and load or rewind position causes the tape to move in relation to its wrap about the capstan and in relation to a read/write device, etc.

The foregoing and other objects, features and advantages of the invention will be apparent from the following more particular description of the preferred embodiments of the invention, as illustrated in the accompanying drawings.

Figure 1:
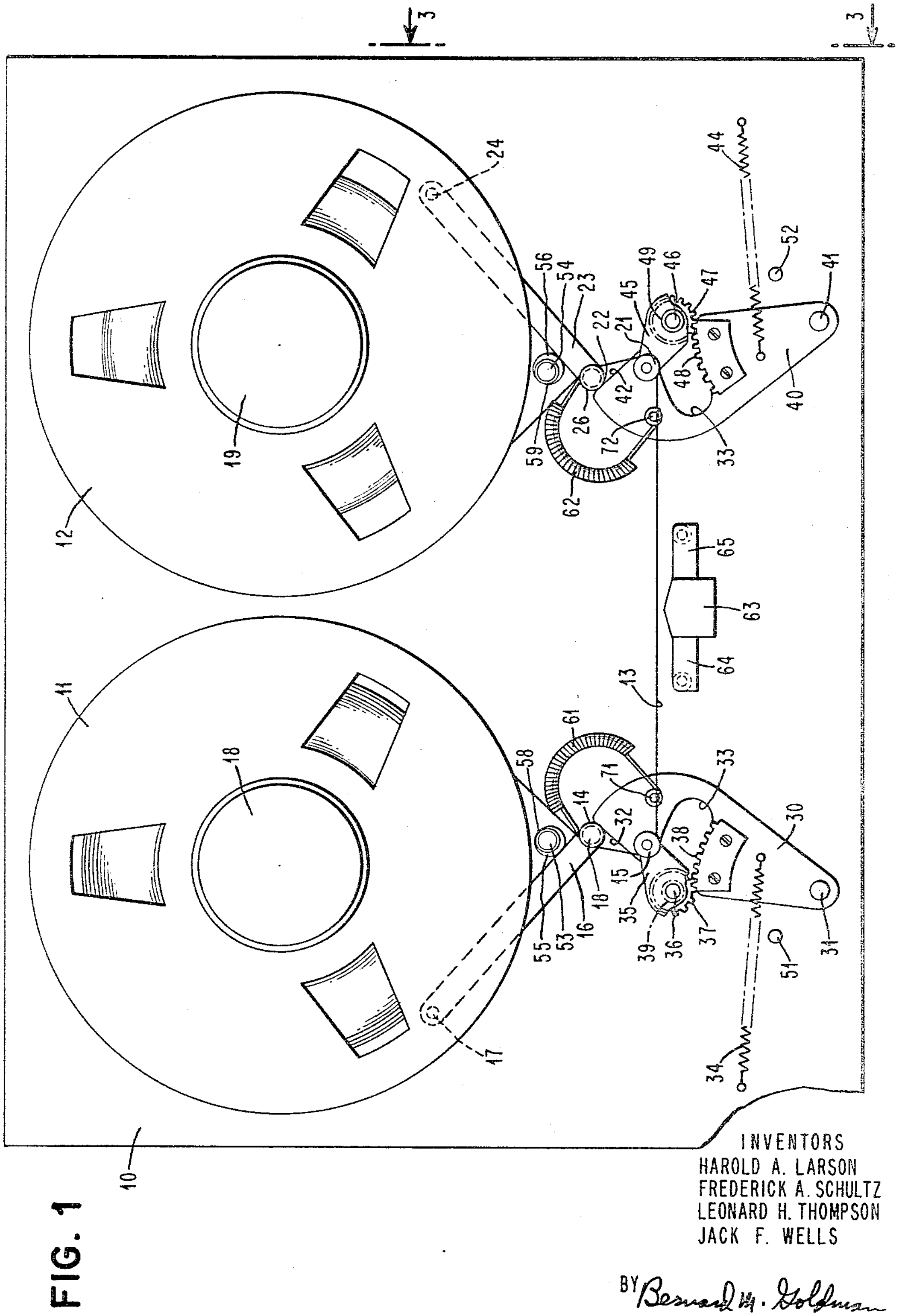
FIG. 1 represents an embodiment of the invention showing it with the tape in load or rewind status.

The specific embodiment in FIG. 1 is next considered. It comprises a tape transport mounted on a frame plate 10. A pair of reels 11 and 12 are respectively mounted on spindles 18 and 19 rotatably supported by frame plate 10. A magnetic tape 13 passes from supply reel 11 to take-up reel 12. The path of tape 13 comprises moving over idler rolls 14, 15, 21 and 26. This is the tape path used for loading tape and for rewinding the tape. This tape path does not engage either drive capstan 39 or 49, or a read or write heat assembly 63'

Idler 14 is rotatably supported by a buffer arm 16 mounted to pivot about a journal 17 which is supported by frame plate 10.

Figures 3, 4:
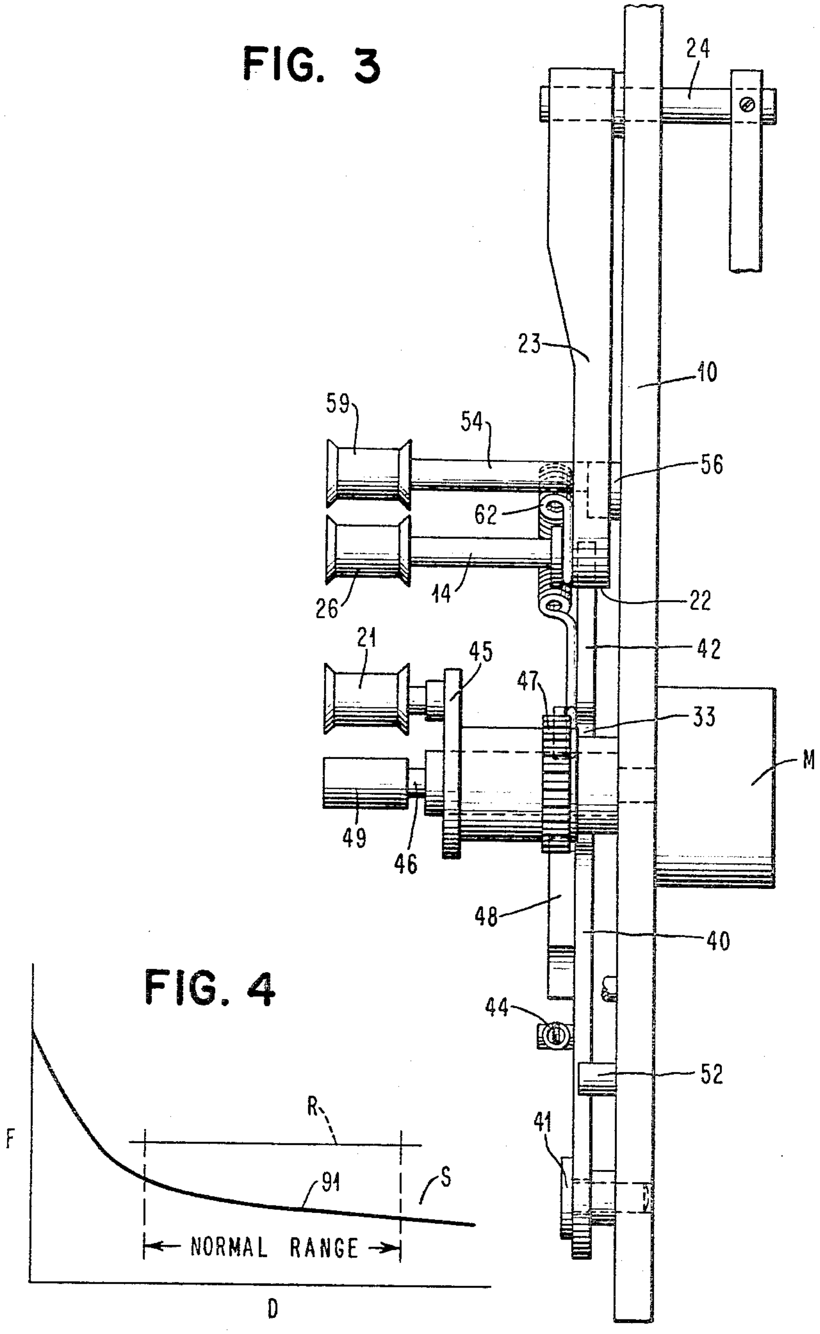
FIG. 3 is a view of section 3—3 in FIG. 1.
FIG. 4 represents the relationship between the force on the tape applied by a buffer arm.

Similarly another buffer arm 23 is provided which may be constructed identically to buffer arm 16. It supports idler 26 rotatably at one end and pivots about a journal 24 mounted in frame plate 10. FIG. 3 shows an elevational view of buffer arm 23 with roll 26 supported rotationally on a shaft 14 extending from the end of buffer 23.

Idler 21 is rotatably supported in cantilever fashion from the end of an arm 45 which pivots about a shaft 46 that supports and drives capstan 49. Similarly, the opposing idler arm 35 is constructed identically to arm 45 with the idler roll 15 rotatably supported at its end, and arm 35 being rotatable about another shaft 36 having capstan 39 fixed at its end for driving engagement with the tape.

A gear 37 is fixed to arm 35 concentrically and rotatably about shaft 36. Similarly a gear 47 is fixed to arm 45 rotatably about shaft 46.

A gear sector 38 has teeth which engage gear 37. Gear sector 38 is fastened to a movable plate 30 which is rotatable about a pivot shaft 31 fastened to frame plate 10. Movable plate 30 is formed with an opening 33 so that its pivotable movement is not obstructed by shaft 36. Similarly, an opposite movable plate 40 is pivotable about fixed shaft 41. Plate 40 has an opening 33 and supports a sector gear 48 that engages gear 47.

A spring 34 is fastened between movable plate 30 and frame 10 to bias plate 30 counterclockwise about pivot 31. A stop 51 projects from frame 10 to limit the counterclockwise movement of plate 30. Likewise a spring 44 biases the opposite plate 40 in a clockwise direction.

An upper edge 42 of plate 40 is shown being engaged by an end 22 of buffer arm 23 in FIG. 1. Approximately a 90° engagement relationship exists between edge 42 and the axis of buffer arm 23 in FIG. 1. A similar 90° engagement relationship can exist between edge 32 and arm 16. A normally straight spring 61 is bent under tension to a U-shape and fastened at one end to a pin 71 fixed to movable plate 30, and is fastened at its opposite end to the shaft 18 fastened to buffer arm 16. Similarly a coil spring 62 has its ends fastened to pin 72 on plate 40 and shaft 14 fixed to arm 23.

In FIG. 1, the relationship between buffer arm 16 and movable plate 30 is such that a line drawn between the centers of spring supporting shafts 18 and 71 would provide a small spring force component transversely of the axis of buffer arm 16 in a direction which urges buffer arm 16 counterclockwise into a locked position against an eccentric cam 55 fixed to a shaft 53 which is fixed to frame plate 10 but is rotatably adjustable. The cam adjustment permits an adjustment for the locked position of arm 16. This component of spring force causes a stable condition for the position of cam 16 in FIG. 1. This stable position is utilized for threading the tape when supply reel 11 is changed, and for rewinding the tape from take-up reel 12 back to supply reel 11.

The configuration of movable plate 40 and its spring 44, and of buffer arm 23 and its spring 62, are in all respects identical to the similar parts explained in connection with movable plate 30. The only difference is that movable plate 40 is pivoted to a stable counterclockwise position, while buffer arm 23 is at its extreme clockwise position against cam 56 supported by shaft 54.

FIG. 3 illustrates a side view of plate 40 in relation to buffer arm 23 and illustrates the relationship of gear 47, gear sector 48, idler arm 45, idler 21 and capstan 49.

Capstan 49 is driven by a motor M which is fastened to the opposite side of frame plate 10 and is coupled by the shaft 46 to capstan 49. Motor M may be an incremental motor for an incremental tape drive, or it may be a continuous speed motor for providing continuous tape movement.

Figure 2:
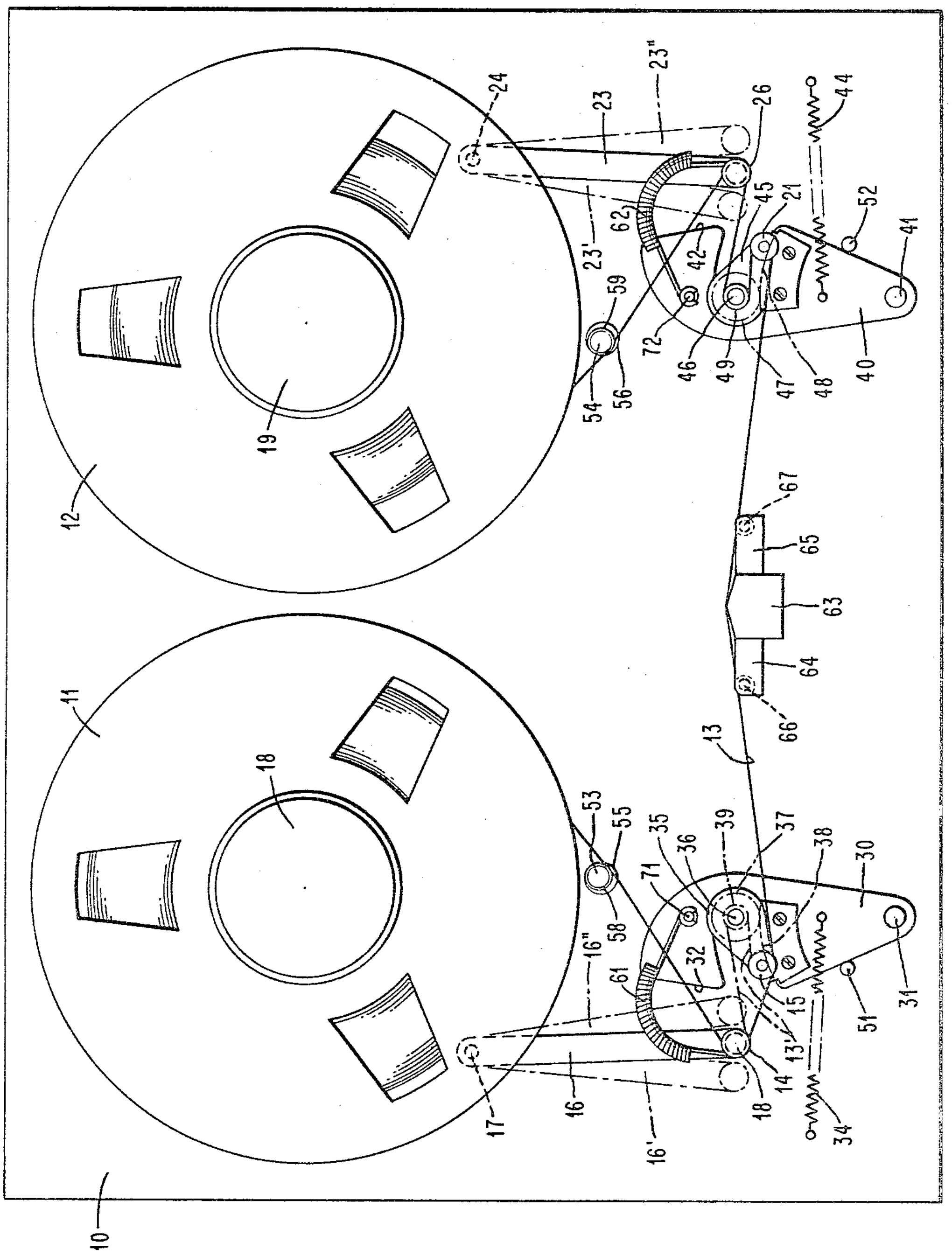
FIG. 2 shows the same embodiment of FIG. 1, but in normal operating status.

Tape 13 is manually threaded about idlers 14, 15, 21 and 22. A slight manual push against buffer arm 16 and 23 away from pins 53 and 54 causes the transport to enter normal read and write status, by the urging of springs 61 and 62 causing an automatic change in the tape path from that shown in FIG. 1 to that shown in FIG. 2. In FIG. 2, the tape wraps about capstan 49 and engages the tape against read/write head assembly 63, that is fastened to cam plate 10. Thus, FIG. 2 shows the normal tape operating path, wherein the tape moves over idlers 58, 14, capstan 39, idlers 15, 66, head assembly 63, idlers 67, 21, capstan 49, and idlers 26 and 59 to reel 12.

The movable plates 30 and 40 in FIG. 2 rest against stop pins 51 and 52 because of the urging of springs 34 and 44, once the buffer arms are released from the load-rewind position shown in FIG. 1.

The transition of the tape path from that shown in FIG. 1 to that shown in FIG. 2 is caused by a condition of instability for springs 61 and 62 after they have been slightly moved from their positions of stability shown in FIG. 1. The condition of instability occurs when the axis of buffer arm 16 or 23 is rotated clockwise to a position which crosses over a line drawn between the centers of spring pivots 18 and 71 or 26 and 72. Beyond this line crossing, the component of spring force urges buffer arms 16 or 23 away from the respective shaft 53 or 54. Each spring 61 or 62 has the normal tendency to attempt to return to a linear configuration.

During normal tape operation in FIG. 2, a special force relationship is provided to tension tape about idler 14 by the urging of springs 61 and 62. A nearly constant tape tension is provided during normal buffer arm movements while reading or writing tape, wherein the buffer arms move between the limits of 16′ and 16″ and between the limits of 23′ and 23″ in FIG. 2.

FIG. 4 illustrates the relationship between the tension force (F) on the tape movement distance (D) of each buffer arm idlers 18 or 26 during normal tape operation. The force (F) varies with distance (D) in the manner shown by curve 91. Spring force F is the force exerted between suports 71 and 14 (or 72 and 18) in FIG. 2, which is along a line which is close to (but not precisely) the center line of the tape loop formed between idlers 58, 14 and capstan 39 for one loop, or formed between idlers 59, 26 and capstan 49. (A constant spring force is ideally desired along the center line of the tape buffer loop.)

The curved path for each buffer arm 16 or 23 provides a compensating non-linearity to that found in the force (F) versus distance (D) portion of curve 91 over the normal operating range of the buffer arm shown in FIG. 4, which results in a substantially constant tape tension force, represented by line (R) in FIG. 4 over the normal operating range of each buffer arm.

Reels 11 and 12 are each operated by a servo system controlled by means (not shown) for sensing the positions of each buffer arm. A reel drive system and means for sensing the position of buffer arm 16 and 23 is described in a U.S. patent application Ser. No. 334,845, filed Dec. 31, 1963, by J. F. Wells and L. H. Thompson entitled, "Buffer Position Sensing and Reel Motor Controls for Magnetic Tape Transport." The servo system rotates the tape reel to release (or acquire) an amount of tape that positions the buffer arm to a nominal position limit such as 23″, from which the buffer arm is moved by capstan operation to an opposite sensed limiting position 23′, which induces the servo to again rotate the reel to restore the buffer arm back to its opposite limit position 23″, etc.

Item 39 may be either a capstan or an idler. If it is an idler, it provides an extra degree of buffering between buffer arm 14 and head assembly 63.

Capstan 49 may be operated to drive the tape in a single direction such as for a write-only tape drive, or it may operate in forward and reverse direction in the manner well known for tape drives. The rewind operation using the tape path of FIG. 1 can be accomplished using the reel drive motor M operated in a reverse direction.

Figure 6:
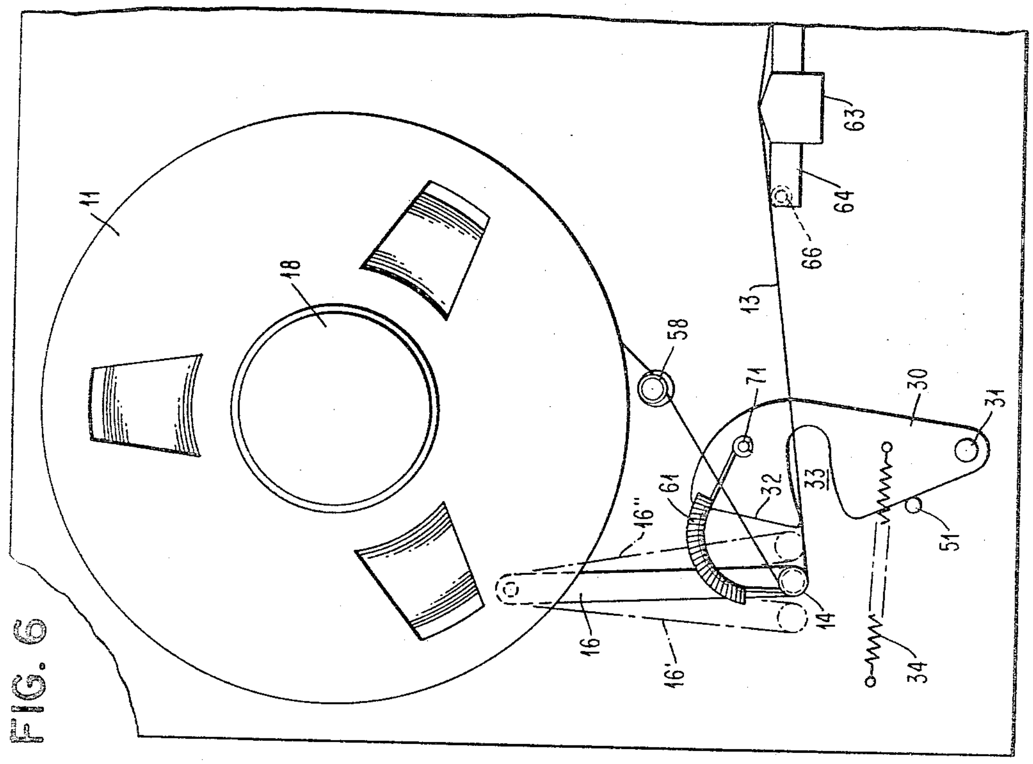
FIG. 6 represents the embodiment of FIG. 5 in normal tape operating status.
Figure 5:
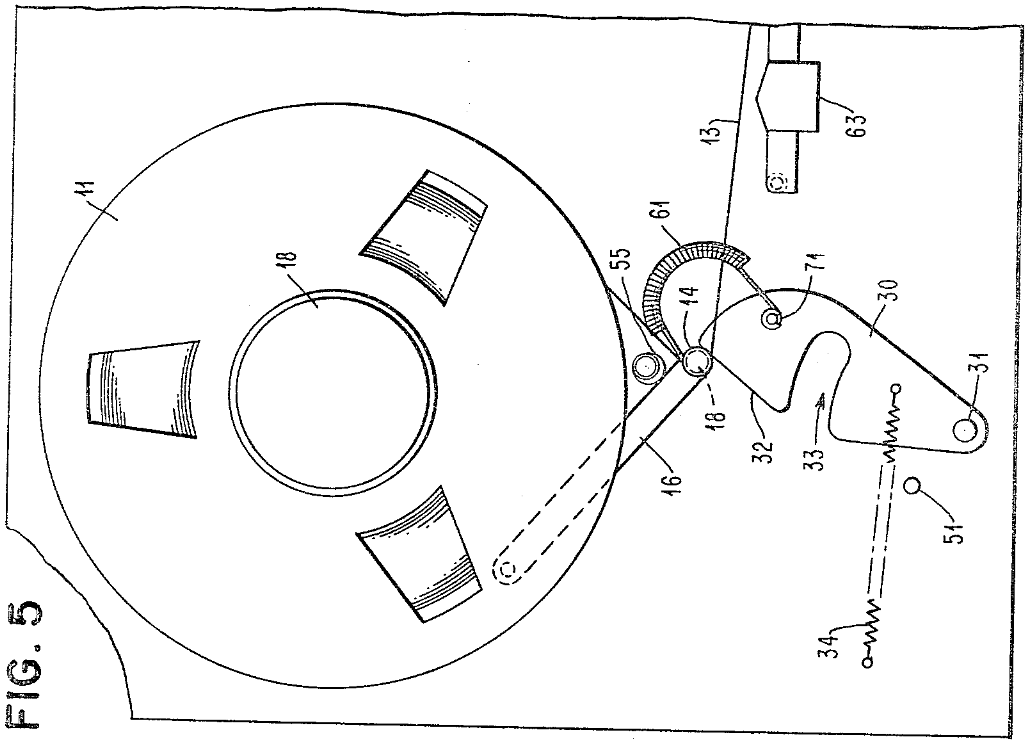
FIG. 5 represents a second embodiment of the invention in load or rewind status.

FIGS. 5 and 6 show two positions for another embodiment of this invention which do not use the idlers 15 and 21 shown in FIGS. 1 and 2. With the elimination of idlers 15 and 21, their accoutrements can also be eliminated, thus eliminating arm 35, pin 36, gear 37 and gear sector 38. There remains in FIGS. 5 and 6 only the idlers 58 and 14 on the left hand side of the drive. The right hand side of the same tape drive is presumed identical to the right hand portion of the tape drive assembly shown in FIGS. 1 and 2 and having driving capstan 49. Thus the relationship between buffer arm 16 and the edge 32 of movable plate 30 in FIGS. 5 and 6 is identical to their relationship described in FIG. 1 for plate 30 and buffer arm 16 to obtain rewind and load positions for the buffer arms. When buffer arm 16 is manually pushed slightly away from idler 55 in FIG. 5, it moves to the position 16 shown in FIG. 6, where it operates over a normal range between positions 16′ and 16″. Thus in FIG. 6 the tape path includes movement over idlers 58, 14 and 66. The linear force relationship exerted by spring 61 on the tape leaving idler 14 is substantially the same in FIG. 6 as explained for FIG. 2.

If a higher than normal tension is applied to the tape, the buffer arms are moved from their normal operating positions shown in FIG. 2 back to the load-rewind positions shown in FIG. 1. This can be done automatically when the tap is wound near its end on one of the reels by actuating the servo motors accordingly, or it can be done manually by pushing the buffer arms 16 and 23 against their stops 55 and 56.

While the invention has been particularly shown and described with reference to preferred embodiments thereof, it will be understood by those skilled in the art that the foregoing and other changes in form and detail may be made therein without departing from the spirit and scope of the invention.

What is claimed is:

1. A positioning arrangement for a movable buffer arm in a tape drive comprising:

a movable plate formed with an arm-engaging side, said buffer arm having a portion engageable with said side in locking engagement, and biasing means directly connected between said buffer arms and said movable plate, whereby said biasing means co-acts with said arm engaging side to enable said locking engagement.

2. A positioning arrangement for a movable buffer arm as defined in claim 1, further comprising, a web passing over a portion of said buffer arm, said buffer arm being brought into engagement with said plate upon the occurrence of a higher than normal operating force being applied to said buffer arm in the directions of said plate to provide said buffer arm in a tape loading position.

3. A positioning arrangement for a movable buffer arm as defined in claim 2, further comprising:

spring bias means connecting said arm to said plate, said arm-engaging side being slightly off a 90° relationship with the axis of said arm in said loading position.

4. A positioning arrangement for a movable buffer arm as defined in claim 3, further comprising, second spring biasing means connected between said plate and a frame of said tape drive.

5. A positioning arrangement for a movable buffer arm as defined in claim 1, further comprising, said bias means comprising a spring having a normal linear axis, said spring being formed with a U-shape between said movable plate and buffer arm and operating in compression.

6. A positioning arrangement for a movable buffer arm as defined in claim 5, in which said U-shaped spring provides a force versus distance relationship cooperating with an angle of movement of said buffer arm to provide an substantially linear force on said buffer arm over a normal operating range of movement of said buffer arm.

7. A positioning arrangement for a movable buffer arm as defined in claim 6, further comprising, a stop for engaging said arm when it is in a tape load-unload position, said U-shaped spring exerting a component of force on said buffer arm in the direction of maintaining the engagement on said stop when in engagement with said stop.

8. A positioning arrangement for a movable buffer arm as defined in claim 4, further comprising, a gear sector connected to said plate, an idler arm pivotably mounted on said tape drive, and a gear connected to said idler arm engaging said gear sector for rotating said idler arm in response to movement of said plate.

9. A positioning arrangement for a movable buffer arm as defined in claim 8, further comprising, a capstan shaft supported by said tape drive, and a capstan supported concentrically at one end of said capstan shaft, said idler arm being pivotably supported about said capstan shaft, and an idler supported rotatably on said idler arm opposite said capstan shaft.

References Cited by the Examiner

UNITED STATES PATENTS

| | | | |
|---|---|---|---|
| 1,998,453 | 4/1935 | Foster et al. | 242—75.3 X |
| 2,903,635 | 9/1959 | Brooke et al. | 318—6 |
| 3,131,339 | 4/1964 | Burr | 318—6 |
| 3,137,427 | 6/1964 | Martin | 226—195 X |

M. HENSON WOOD, Jr., *Primary Examiner.*

J. N. ERLICH, *Assistant Examiner.*